G. W. GRISDALE, Jr.
MECHANICAL MOVEMENT.
APPLICATION FILED DEC. 15, 1915.
1,194,288.
Patented Aug. 8, 1916.
4 SHEETS—SHEET 1.
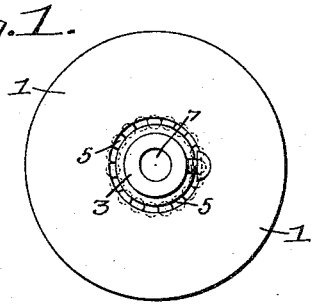
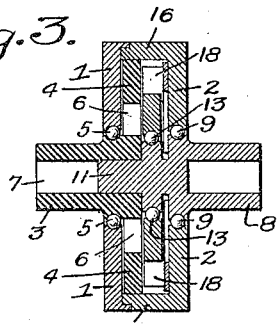
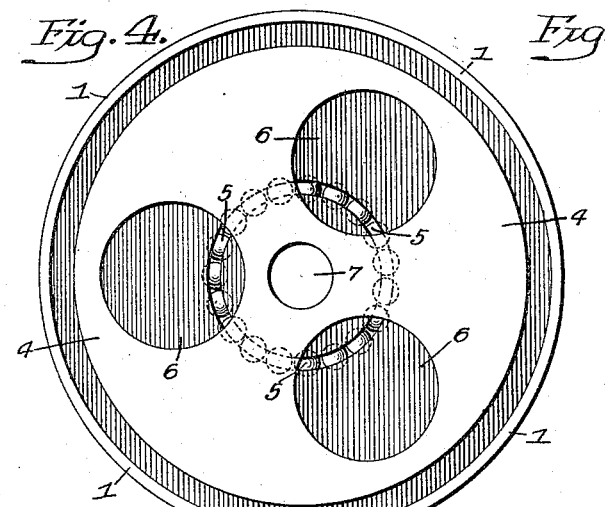
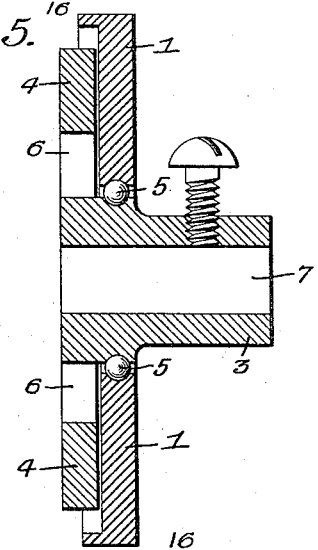
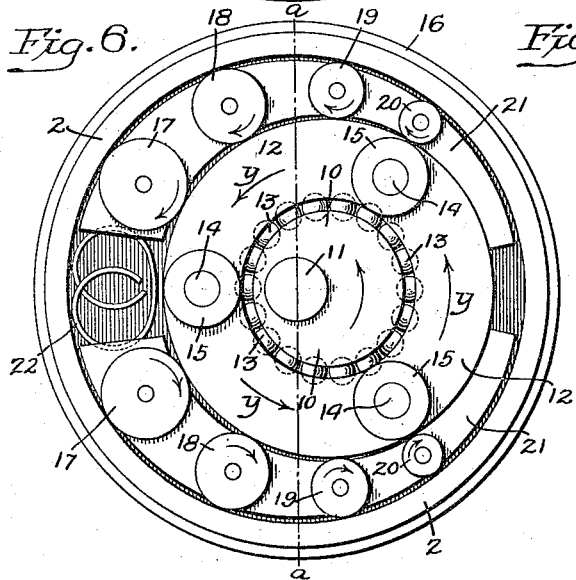
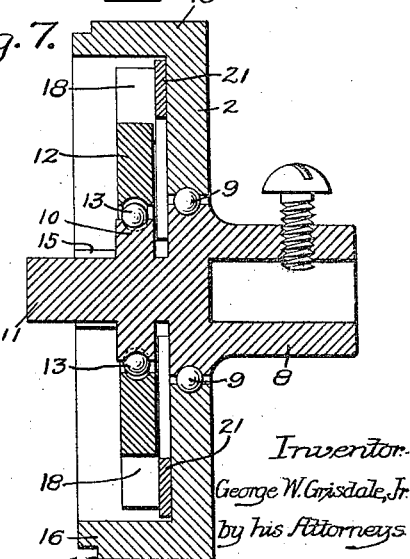
Inventor.
George W. Grisdale, Jr.
by his Attorneys
Howson & Howson G. W. GRISDALE, Jr.
MECHANICAL MOVEMENT.
APPLICATION FILED DEC. 15, 1915.
1,194,288.
Patented Aug. 8, 1916.
4 SHEETS—SHEET 2.
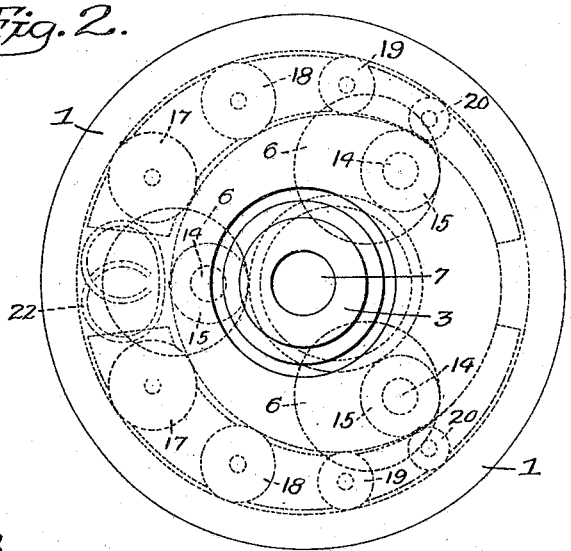
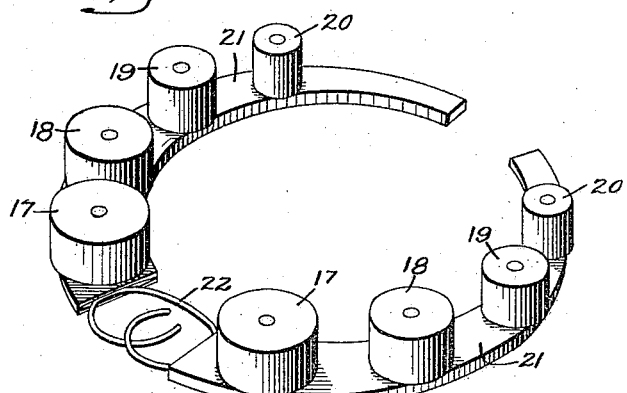
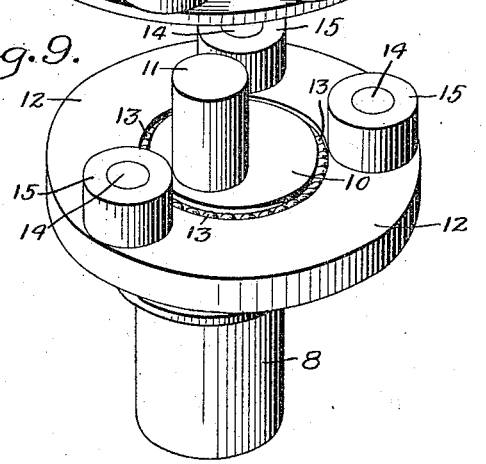
Inventor —
George W. Grisdale, Jr.
by his Attorneys —
Howson & Howson

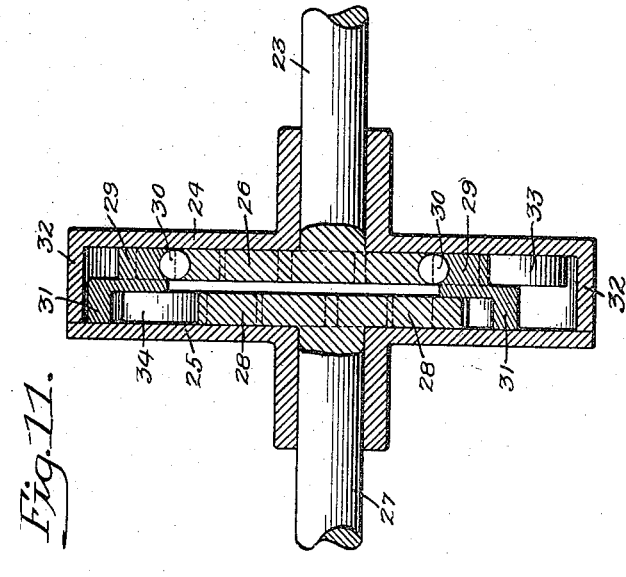
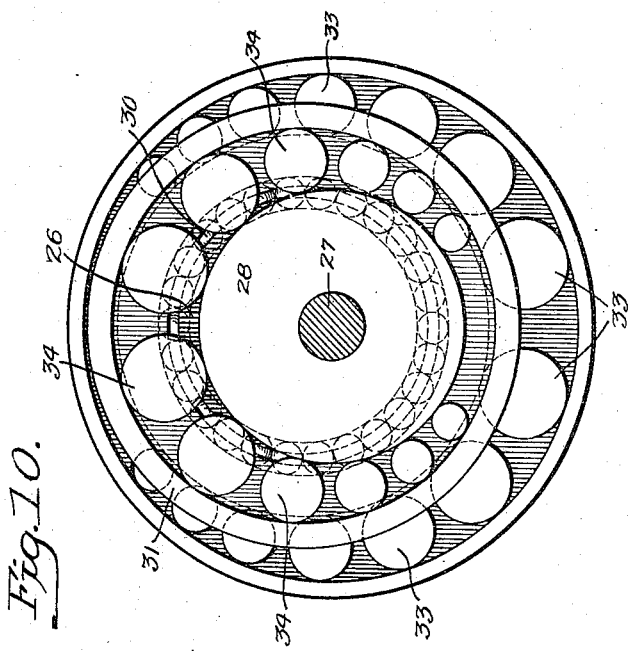

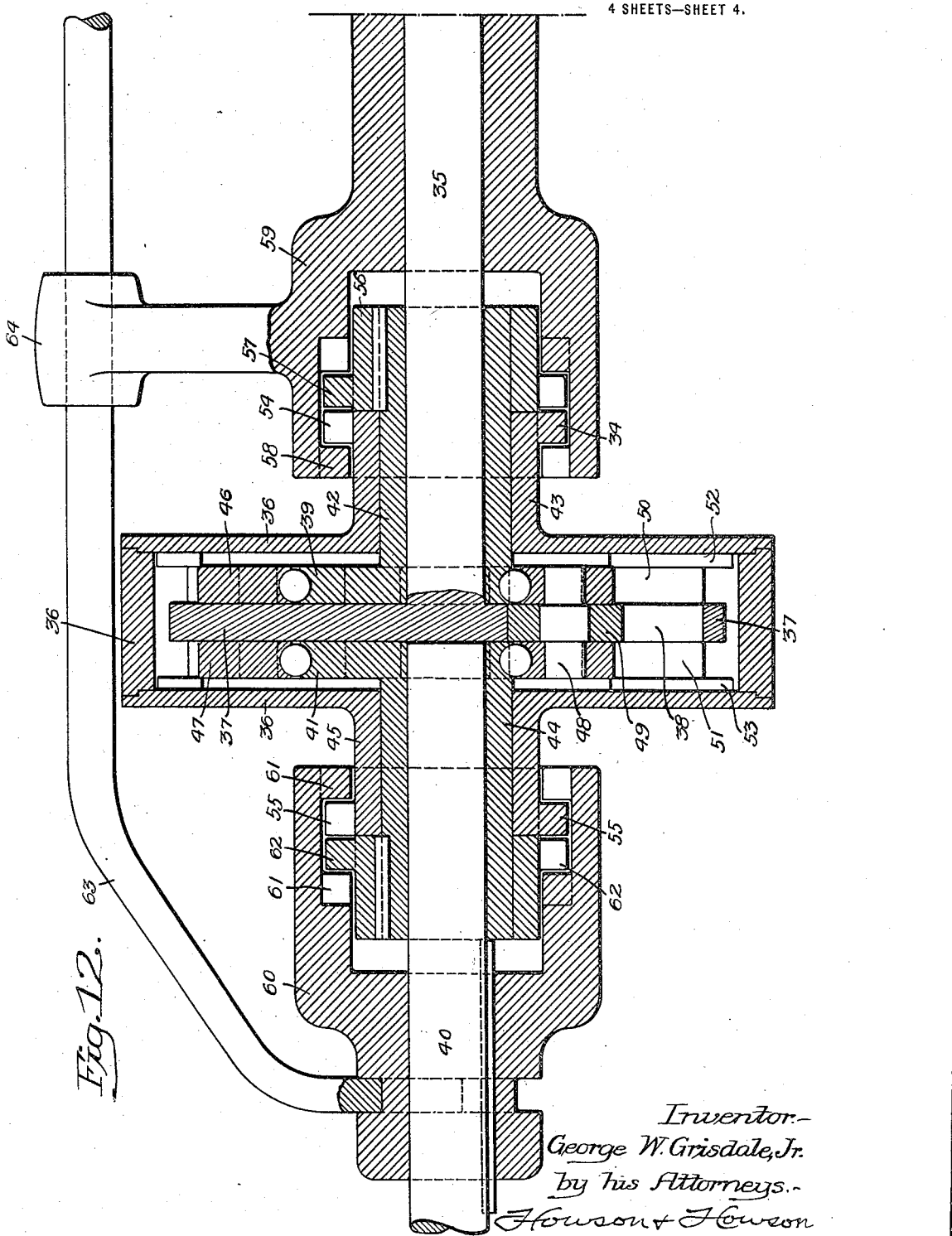

UNITED STATES PATENT OFFICE.

GEORGE W. GRISDALE, JR., OF PHILADELPHIA, PENNSYLVANIA.

MECHANICAL MOVEMENT.

1,194,288.  Specification of Letters Patent.  Patented Aug. 8, 1916.

Application filed December 15, 1915. Serial No. 67,023.

*To all whom it may concern:*

Be it known that I, GEORGE W. GRISDALE, Jr., a citizen of the United States, residing in Philadelphia, Pennsylvania, have invented certain Improvements in Mechanical Movements, of which the following is a specification.

One object of my invention is to provide a novel and relatively simple combination of parts constituting a mechanical movement for transmitting power from a driving to a driven member, the invention in one form including a casing to or from which the power may be transmitted.

It is also desired to provide a simple, inexpensive and efficient form of gearing for varying the speed at which a driven member is operated from a driving member.

These objects and other advantageous ends I secure as hereinafter set forth, reference being had to the accompanying drawings, in which, Figure 1 is a front elevation of a simple form of my invention; Fig. 2 is an elevation on an enlarged scale, illustrating in dotted lines the arrangement of the interior parts; Fig. 3 is a central vertical section of the device illustrated in Fig. 1; Fig. 4 is an elevation illustrating one of the casing members and the movable element carried thereby; Fig. 5 is a central vertical section of the parts shown in Fig. 4; Fig. 6 is an elevation of the second casing member and the parts carried thereby; Fig. 7 is a vertical section on the line $a$—$a$, Fig. 6; Figs. 8 and 9 are perspective views illustrating details of the apparatus; Figs. 10 and 11 are respectively an elevation and a vertical section of a modification; and Fig. 12 is an elevation of a second modification.

In Figs. 1 to 9 of the above drawings, 1 and 2 represent the two parts of a flat cylindrical casing, of which the first is flanged to fit over the second so as to inclose the moving parts of the device. The casing member 1 rotatably supports a hub portion having an integral concentric disk 4 and provided with ball bearings 5 mounted between it and said hub portion. The disk 4 is provided with three circular openings 6, whose centers are preferably equally spaced upon the circumference of a circle concentric with a passage 7 through the hub 3. The casing member 2 likewise has a central opening in which is centrally mounted a hub portion 8 and there are suitable ball bearings 9 between it and said portion. Also connected to, and in the present instance formed integral with, the hub portion 8, is an eccentric 10 having a spindle extension 11 concentric with the hub and projecting into the opening 7 of the hub 3, which thus provides a bearing for it. The eccentric, through anti-friction bearings 13 supports a ring 12 which has projecting from its outer face three spindles 14 each carrying a roller 15. Between the outer edge of the ring 12 and the adjacent inner surface of the cylindrically curved flange 16 of the casing member 2, I mount two series of rollers 17, 18, 19 and 20, rotatably supported on two suitably formed carriers 21, one pair of whose adjacent ends are yieldingly forced apart by a spring 22. It is noted that the rollers of each set are of progressively varying diameters, so that each of them engages the inner wall or inner cylindrical surface of the flange 21 and the outer edge of the ring 12. When the casing members 1 and 2 are assembled, the rollers 15 respectively enter the openings 6 of the disk 4, being of such diameter, that as shown in dotted lines in Fig. 2, each of them makes a tangential contact with the wall of its opening.

Set screws or other suitable devices are preferably provided whereby the hubs 3 and 8 are respectively connected to shafts, and under conditions of operation power applied to turn the latter of said hubs in a counter clockwise direction for example, causes rotation of the eccentric 10. Because of the rotative thrust of this part transmitted through the ring 12, the various rollers 17 to 20 of both sets will turn in a clock-wise direction, and owing to the frictional engagement of said ring 12 with the peripheries of these rollers, it is turned upon the eccentric 10 in a counter clock-wise direction, as indicated by the arrow $y$ but at an increased speed. At the same time that the rollers 17 to 20 inclusive, turn on their spindles, they are bodily carried around the casing with their supporting structures 21 at the same speed as the ring 12, and since the rollers 15 frictionally engage the inner walls of the openings 6 in the disk 4, as the ring 12 turns upon the eccentric 10, said disk and with it the hub 3 are likewise rotated at the speed of the ring. The rollers 15 rotate in engagement with the walls of the openings 6 as the distances of the spindles 14 from the center line of the hubs vary, and the hub 3 is thus driven at a speed higher than that of the hub 8, depending on the proportions of the various parts.

If desired, power may be applied to the hub 3, in which case the hub 8 is driven at a reduced speed, the casing being held from rotation by any suitable means in this as well as in the case first described. On the other hand, the casing may be left free to rotate when power is delivered to or taken from one of the hubs, while the other hub is held from turning. Obviously the members 21 may be made of any desired or suitable form and construction, since they serve merely as carriages or supports for the rollers 17—20.

In that form of the invention shown in Figs. 10 and 11, the shaft 23 which extends into the casing 24—25, has fixed to or formed integral with it an eccentric 26, while a second shaft 27, likewise extending into said casing, also has fixed to it a disk 28 concentric with both of the shafts 23 and 27. A double ring structure 29—31 is rotatably mounted on the eccentric 26 through anti-friction bearings 30 and in addition to extending in the plane of said eccentric, it projects laterally into the plane of the disk 28. Both this laterally extending portion 31 and the main portion 29 of said ring structure are concentric with the eccentric 26 so that said part 31 is eccentric to the disk 28 and the part 29 is eccentric to the interior surface of the flange 32 of the casing 24. Within the space between said surface and the part 29 of the double ring I mount two series of rollers 33 of which those of each series progressively decrease in diameter from the widest part of the space in which they are mounted toward its narrowest part. Similarly in the space between the ring section 31 and the edge of the disk 28, I mount two other series of rollers 34 which likewise progressively vary in diameter in both directon from the widest part of the space in which they are mounted to its narrowest portion. Any suitable means (not shown) may be provided for maintaining the rollers of these various sets frictionally engaged with their coacting members, and with the arrangement shown, power applied to the shaft 23 is transmitted to the shaft 27, which is driven at a speed differing from that of said shaft 23;—it being assumed that the casing structure 24—25 is held from rotation. On the other hand if the shaft 27 be held, the casing 32 is rotated.

In that form of the invention shown in Fig. 12, I have illustrated my invention as applied to a combination whereby the shaft 35 may be caused to turn a shaft 40 either at a reduced speed, at the same speed, or in a reverse direction. With this object in view, the shaft 35 as before is extended into the casing 36, in which it has centrally fixed to it a disk 37 having a number of circular holes 38 similar to the holes 6 in Fig. 4. A shaft 40 also extends into the casing so as to abut on the disk 37, on opposite sides of which are mounted eccentrics 39 and 41, of which the first is carried on a sleeve 42 rotatable on the shaft 35 and extended with it through a hub 43 of a casing 36. The eccentric 41 is similarly mounted on a sleeve 44 which extends through and beyond a hub 45 projecting from the opposite side of the casing 36.

Mounted on the eccentric 39 is a ring 46, and a second ring 47 is similarly mounted on the eccentric 41; these rings being rigidly connected by a plurality of pins or spindles 48 which extend through the openings 38 of the disk 37 and serve as shafts for rollers 49 which operate within said openings 38 in the same manner as do the rollers 15 in the openings 6. Between each of the eccentrics and its ring are provided anti-friction bearing and between each ring and the inside cylindrical surface of the casing 36 are two series of rollers 50 and 51 progressively decreasing in diameter in both directions from the widest part of the space between each ring and the casing, to the narrowest portion thereof, as described in connection with the other figures of the drawing. Two plates 52 and 53 are rotatably mounted on the sleeves 42 and 44 respectively within the casing and serve to support the spindles on which said rollers are rotatably carried.

The hub 43 has a series of projecting teeth 54 and the hub 45 has a similar set of teeth 55. A collar 56 fixed to the sleeve 42 is provided with another set of teeth 57 and these as well as the teeth 54 are designed to be engaged with a set of teeth 58 projecting inwardly from a collar 59 slidably mounted on the shaft 45 but held by suitable means from turning. A second collar 60, splined to the shaft 40 so as to be slidable thereon but compelled to rotate therewith, has a series of inwardly projecting teeth 61 capable of engaging either the teeth 55 of the hub 45 or the teeth 62 on the sleeve 44. A rod 63, guided in an arm 64 projecting from the sleeve 59, is forked so as to engage and be capable of holding the sleeve 60, while the sleeve 59 likewise may be moved longitudinally of the shaft 35 by any desired means. If now said two collars be adjusted so that the teeth 61 of the sleeve 60 engage the teeth 62 and the teeth 58 engage the teeth 54 of the hub 43, then when power is applied to the shaft 35, the shaft 40 is turned at a speed less than that of said driving shaft. On the other hand, if the sleeve 60 be shfted to bring the teeth 61 into engagement with the teeth 55 and the teeth 58 on the collar 59 be left in engagement with the teeth 54, then the shaft 40 will be turned directly from the shaft 35 in the same direction and at the same speed. With the teeth 61 in engagement with the teeth 55, if the sleeve 59 be shifted to bring the teeth 58 into engagement with the teeth 57, then the shaft 40 will be driven in a direction opposite that of the shaft 35.

I claim:—

1. The combination of two shafts; a member rotatable concentrically of said shafts; a circular structure on one shaft; an eccentric structure on the other shaft; and means for transmitting movement from the eccentric structure to the circular structure or vice versa.

2. The combination of two shafts; a member rotatable concentrically of said shafts; a circular structure on one shaft; an eccentric structure on the other shaft; with means for transmitting movement from the eccentric structure to the circular structure or vice versa, the same including a ring structure rotatable on the eccentric; and a series of rollers of progressively varying diameters operative between the ring structure and the rotatable member.

3. The combination of two shafts; an inclosing casing rotatable concentrically with said shafts; a circular structure on one shaft; an eccentric structure on the other shaft; and means for transmitting movement from the eccentric structure to the circular structure or vice versa, the same including a ring structure rotatable on the eccentric; and two series of rollers of progressively varying diameters operative between the ring structure and the adjacent cylindrical inner surface of the casing.

4. The combination of two shafts; a member rotatable concentrically with the shafts and having a cylindrical interior bearing surface; a circular structure on one shaft; an eccentric structure on the other shaft; means for transmitting movement from the eccentric structure to the circular structure or vice versa, the same including a ring structure rotatable on the eccentric; a series of rollers of progressively varying diameters operative between said ring structure and the bearing surface of the rotatable member; with means for maintaining the rollers properly spaced and in engagement with their coöperating surfaces.

5. The combination of two shafts; a member rotatable concentrically with said shafts; a circular structure on one shaft having circular openings therein; an eccentric structure on the other shaft; a ring rotatably mounted on said eccentric structure; pins on the ring projecting respectively into the openings of the circular structure; and means for causing rotation of the ring structure when either of the shafts is rotated.

6. The combination of two shafts; a member rotatable concentrically with said shafts; a circular structure on one shaft having circular openings therein; an eccentric structure on the other shaft; a ring rotatably mounted on said eccentric structure; pins on the ring projecting respectively into the openings of the circular structure; and means for causing rotation of the ring structure when either of the shafts is rotated, the same including rollers mounted between said ring structure and the adjacent surface of the rotatable member.

7. The combination with two concentric shafts of a casing having a cylindrical bearing surface; an eccentric mounted on one of the shafts; a disk mounted on the other shaft; a ring rotatable on the eccentric, one of the two structures comprised by the ring and the disk having a plurality of circular openings and the other having pins projecting laterally into said openings; with rollers operative between the ring and the inner surface of the casing.

8. The combination of two shafts; a structure rotatable concentrically with said shafts; an eccentric on one of the shafts; a disk on the other shaft; a ring rotatably mounted on the eccentric structure; means for operatively connecting the ring and the disk; rollers between the ring and the adjacent surface of the rotatable structure; with means for connecting one of the shafts either to the eccentric or to the rotatable structure at will.

9. The combination of two shafts; a structure rotatable concentrically with said shafts; an eccentric on one of the shafts; a disk on the other shaft; a ring rotatably mounted on the eccentric structure; means for operatively connecting the ring and the disk; rollers between the ring and the adjacent surface of the rotatable structure; with means for connecting one of the shafts to the circular structure or to the casing at will.

10. The combination of two shafts; a structure rotatable concentrically with said shafts; an eccentric on one of the shafts; a disk on the other shaft; a ring rotatably mounted on the eccentric structure; means for operatively connecting the ring and the disk; rollers between the ring and the adjacent surface of the rotatable structure; means for connecting one of the shafts to the circular structure or to the casing at will; and means for connecting the other shaft either to the eccentric or to the casing at will.

GEORGE W. GRISDALE, Jr.

Copies of this patent may be obtained for five cents each, by addressing the "Commissioner of Patents, Washington, D. C."